United States Patent
Ueyama

(10) Patent No.: US 7,650,217 B2
(45) Date of Patent: Jan. 19, 2010

(54) ADAPTIVE CRUISE CONTROL SYSTEM AND NAVIGATION SYSTEM'S MEDIA WITH VEHICLE CONTROL INFORMATION INCLUDED

(75) Inventor: Mikio Ueyama, Ohira (JP)

(73) Assignee: Hitachi, Ltd., Tokyo (JP)

( * ) Notice: Subject to any disclaimer, the term of this patent is extended or adjusted under 35 U.S.C. 154(b) by 616 days.

(21) Appl. No.: 11/475,928

(22) Filed: Jun. 28, 2006

(65) Prior Publication Data

US 2007/0005218 A1  Jan. 4, 2007

(30) Foreign Application Priority Data

Jun. 30, 2005  (JP) ............... 2005-190870

(51) Int. Cl.
*B60K 31/00* (2006.01)
(52) U.S. Cl. .......................... 701/96; 342/70
(58) Field of Classification Search .................. None
See application file for complete search history.

(56) References Cited

U.S. PATENT DOCUMENTS 6,427,111 B1  7/2002  Dieckmann
6,810,319 B2 *  10/2004  Manaka ..................... 701/96
2002/0032514 A1  3/2002  Kuroda et al.
2002/0165657 A1  11/2002  Winner et al.
2003/0109980 A1  6/2003  Kojima et al.
2003/0204298 A1  10/2003  Ahmed-Zaid et al.

FOREIGN PATENT DOCUMENTS

| DE | 102 58 167 A1 | 7/2003 |
| EP | 1 313 078 A2 | 5/2003 |
| JP | 7-232573 A | 5/1995 |
| JP | 2004-136800 | * 5/2004 |

OTHER PUBLICATIONS

European Search Report dated Apr. 4, 2008 (Five (5) pages).

* cited by examiner

*Primary Examiner*—Michael J. Zanelli
(74) *Attorney, Agent, or Firm*—Crowell & Moring LLP

(57) ABSTRACT

On the basis of headway distance information issued from a headway distance detecting device for detecting a headway distance between a controlled vehicle and a preceding vehicle and terrain shape information issued from a terrain shape estimating device for estimating a terrain shape around the position of the controlled vehicle, a terrain shape at a position spaced from the position of the controlled vehicle by the headway distance is detected, and the speed of the controlled vehicle is controlled according to the terrain shape information.

13 Claims, 15 Drawing Sheets

PROCESSING STEPS

WHEN PRECEDING VEHICLE WAS LOST

WHEN CONTROLLED VEHICLE REACHES PRECEDING VEHICLE LOST SITE POINT

WHEN PRECEDING VEHICLE WAS LOST

WHEN CONTROLLED VEHICLE PASSED THROUGH INCLINATION END SITE POINT

FIG.17
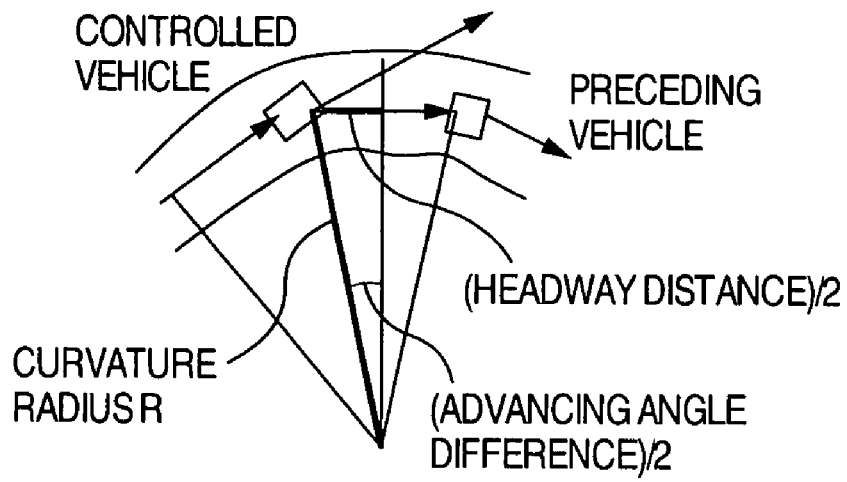
(CURVATURE RADIUS R) = (HEADWAY DISTANCE)/2/sin ((ADVANCING ANGLE DIFFERENCE)/2)
(ADVANCING ANGLE DIFFERENCE) = 2 X arcsin ((HEADWAY DISTANCE)/2/(CURVATURE RADIUS R))
(SENSOR DETECTION ANGLE) = (ADVANCING ANGLE DIFFERENCE)/2
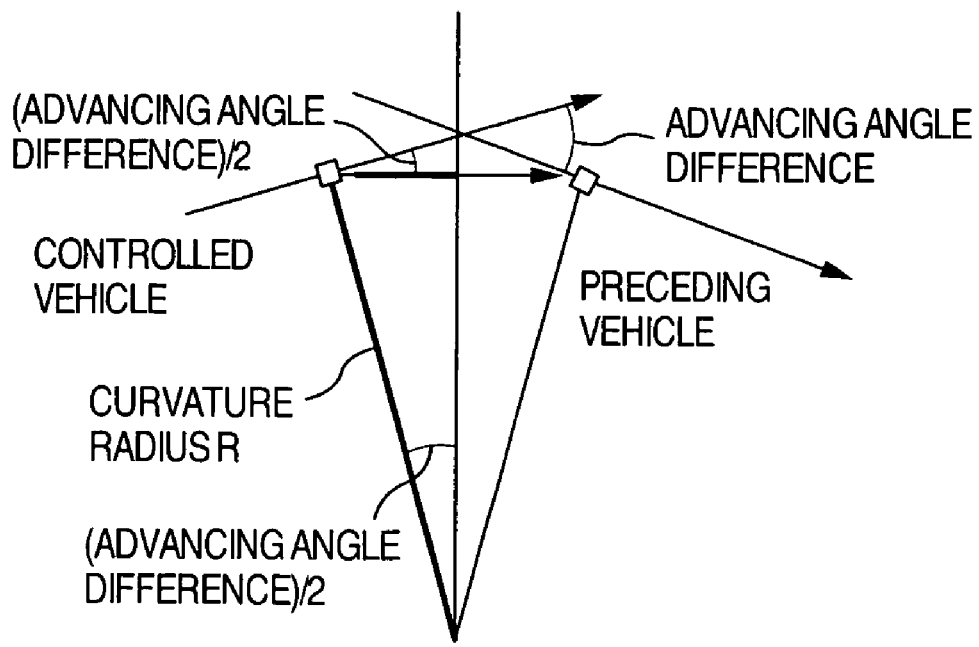

ADAPTIVE CRUISE CONTROL SYSTEM AND NAVIGATION SYSTEM'S MEDIA WITH VEHICLE CONTROL INFORMATION INCLUDED

BACKGROUND OF THE INVENTION

The present invention relates to an adaptive cruise control system which is mounted in a vehicle to control the operation of the vehicle associated with cruising.

An adaptive cruise control (which will be referred to as ACC or ACC control, hereinafter) system can realize a function of following up a preceding vehicle. Though the preceding vehicle follow-up function of the related art ACC system is intended to be used in expressways, the system is spreading its application to ordinary roads whose terrains vary more largely than the expressway.

However, the ACC system confirms a headway distance with use of a millimeter-wave radar, a laser radar, a stereo camera, etc. Thus when the vehicle comes to a site point where road inclination or curvature is changed, departure of the preceding vehicle from a laser or camera detection range causes the system not to able to detect the preceding vehicle. That is, there occurs a so-called 'lost condition or state' that the system fails to detect the preceding vehicle or the system loses the preceding vehicle. For example, when the vehicle runs under the ACC control such a terrain that the vehicle runs on an ascending slope immediately followed by a descending slope, the preceding vehicle is hidden by the top of the road and the ACC system temporarily loses the preceding vehicle. In this case, the ACC system of the vehicle (to be controlled by the ACC system, which vehicle will be referred to merely 'the controlled vehicle', hereinafter) determines the absence of the preceding vehicle, and the vehicle runs at a set speed selected by the driver as a target speed. Thus, when the target speed is higher than a speed under the ACC control, the controlled vehicle is accelerated. However, the controlled vehicle comes nearly to a preceding-vehicle lost site point, the preceding vehicle suddenly appears. This causes the vehicle to be returned to ACC control, thus abruptly decelerating the vehicle.

A related art technique is known that, after an ACC system lost a preceding vehicle, a target speed is set at a current vehicle speed, so that, when the controlled vehicle subsequently comes to a preceding-vehicle lost site point (where the preceding vehicle departs from a headway distance detection range of the controlled vehicle), based on a change in a steering angle or in a road inclination the ACC system determines temporary lost condition of the preceding vehicle is caused by the terrain (see JP-A-7-232573).

SUMMARY OF THE INVENTION

In the related art, however, when the ACC system of the controlled vehicle fails to detect the preceding vehicle, the system cannot decide whether the lost condition of the preceding vehicle was caused by the preceding vehicle running on a turn or curve or an ascending slope or by the lane change of the preceding vehicle, or the preceding vehicle actually disappeared ahead of the controlled vehicle. In the latter case, that is, when the lost condition of the preceding vehicle is caused by the lane change of the preceding vehicle, there is actually no preceding vehicle in front of the controlled vehicle. Thus it is desirable to immediately accelerate the controlled vehicle. However, the controlled vehicle is kept undesirably at the preceding-vehicle speed until the controlled vehicle arrives at the preceding-vehicle lost site point. Thus the driver gets unnatural feeling.

In a related art system, the lost condition of a preceding vehicle caused by a controlled vehicle running on such a terrain shape as a curve or an ascending slope is determined on the basis of the terrain shape of the position of the controlled vehicle at the time of losing the preceding vehicle and changes in the steering angle of the controlled vehicle or in the road inclination until the controlled vehicle arrives at a preceding-vehicle lost site point (where the preceding vehicle departs from a headway distance detection range of the controlled vehicle). For this reason, when the vehicle runs in a zigzag or the running altitude changes in stepwise before the preceding-vehicle lost site point or when the preceding-vehicle lost site point is on a flat place or a straight road, the ACC system may fail, in some cases, to successfully detect changes in the steering angle or in the road inclination. Accordingly, the method for determining the cause of the lost condition of the controlled vehicle only by the steering angle of the controlled vehicle as controlled vehicle information or by the road inclination has a limitation on accuracy. Further, since the controlled vehicle is required to run as far as the preceding-vehicle lost site point, the timing of the determination may be delayed in some cases.

It is an object of the present invention to improve a driving performance and a safety by immediately detecting the cause of a lost condition of a preceding vehicle to control the cruising operation of controlled vehicle according to the cause of the lost condition of the preceding vehicle.

On the basis of headway distance information obtained from a headway distance detecting device for detecting a headway distance between a controlled vehicle and a preceding vehicle and a terrain shape information obtained from a terrain shape estimating device for estimating a terrain shape in the vicinity of the position of the controlled vehicle; a system detects a terrain shape at the position of the controlled vehicle and a terrain shape at a position away from the controlled vehicle by the headway distance to perform vehicle speed control according to the terrain shape information.

In accordance with the present invention, a system can immediately detect the cause of a lost condition of a preceding vehicle. The system further can enhance a driving performance and a safety by controlling the driving operation according to the cause of the lost condition of the preceding vehicle.

Other objects, features and advantages of the invention will become apparent from the following description of the embodiments of the invention taken in conjunction with the accompanying drawings.

BRIEF DESCRIPTION OF THE DRAWINGS

FIG. 17 shows diagrams for explaining an advancing angle difference at a curve site point.

DESCRIPTION OF THE EMBODIMENTS

Explanation will be made in connection with 3 embodiments which follow.

Figure 1:
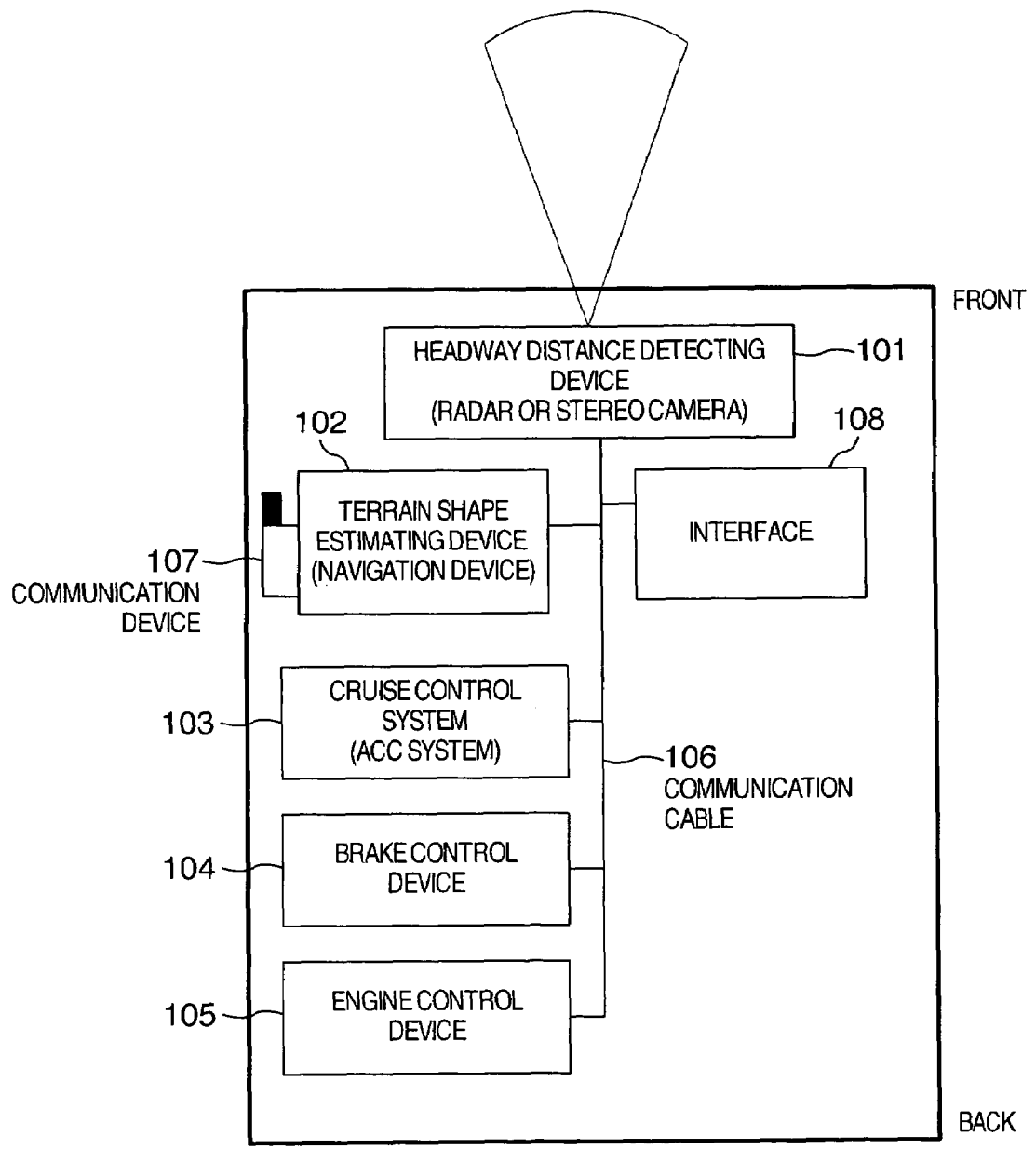
FIG. 1 is a block diagram of an example of a vehicle in which an adaptive cruise control system in accordance with an embodiment of the present invention is mounted.

FIG. 1 shows an embodiment of the present invention in the best mode. A headway distance detecting device 101 detects a headway distance to a preceding vehicle or an obstacle and a relative speed. For example, the headway distance detecting device is a radar, a stereo camera, or the like. A terrain shape estimating device 102, on the basis of information from an artificial satellite or from an infrastructure for a traffic control on a road, finds a terrain difference between terrain information about a controlled vehicle and terrain information about a preceding vehicle away from the controlled vehicle by a headway distance on a map. For example, the terrain shape estimating device is a vehicle navigation device or the like. A cruise control system 103 controls the headway distance. For example, the cruise control system is an adaptive cruise control (ACC) system (automatic follow-up system). A brake control device 104 controls deceleration of the vehicle by controlling a brake. An engine control device 105 controls the acceleration and deceleration of the vehicle by controlling a throttle opening, a fuel injection amount and so on. In this connection, the brake control device 104 and the engine control device 105 may be combined into an integral driving force control device. A communication cable 106 performs transfer of data necessary for controlling the cruising operation of the vehicle. A communication device 107 is connected to a terrain shape estimating device (the navigation device in FIG. 1) to exchange information with an information transmitter installed at the side of a road, a satellite, or the like. An interface 108 includes an input unit which can adjust the vehicle and keep a headway distance constant according to a constant vehicle speed arbitrarily set by the driver or according to a set speed. The interface 108 also includes an output unit which can display a headway distance according to a constant vehicle speed arbitrarily set by the driver or according to a set speed. The interface 108 may include either one of the input and output units. Further, the temporary lost condition of a preceding vehicle can be displayed or informed to the driver by sound output. The interface 108 may be provided independently. Or for the purpose of reducing the number of components used, the vehicle navigation device may be used as the interface.

In order to reduce the number of components used, further, the function of the cruise control system 103 may be built in the navigation device or in a sensor.

The control operation of the present invention is implemented by software, and the software is stored in the adaptive cruise control system and in the navigation device.

Embodiment 1

An embodiment of the present invention will be explained by referring to the accompanying drawings.

Figure 2A:
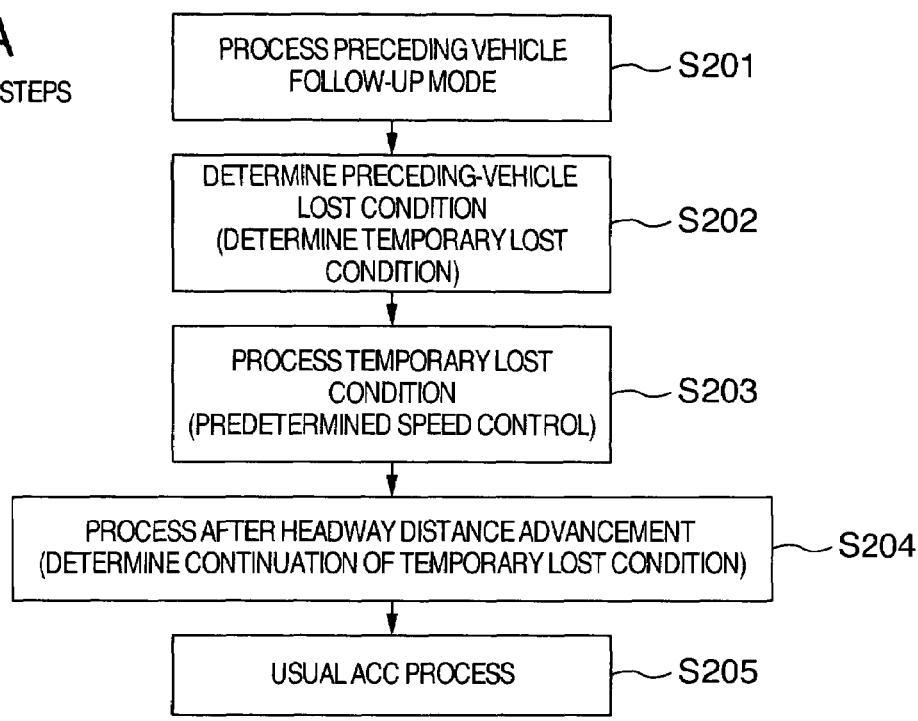
FIGS. 2A, 2B, and 2C show diagrams for explaining an example when the system detects a lost condition of a preceding vehicle and how to cope with it.
Figure 2B:
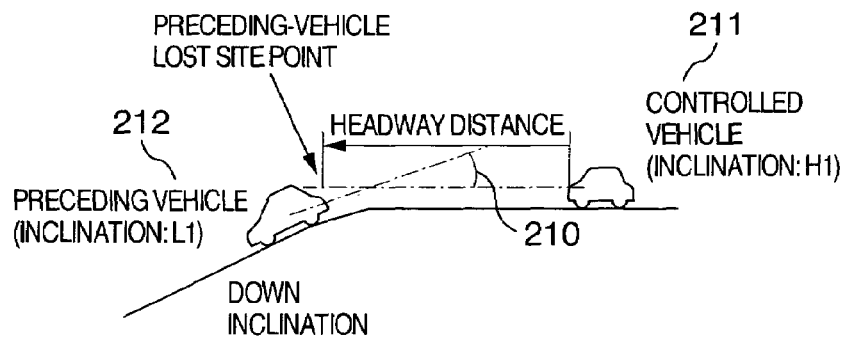
Figure 2C:
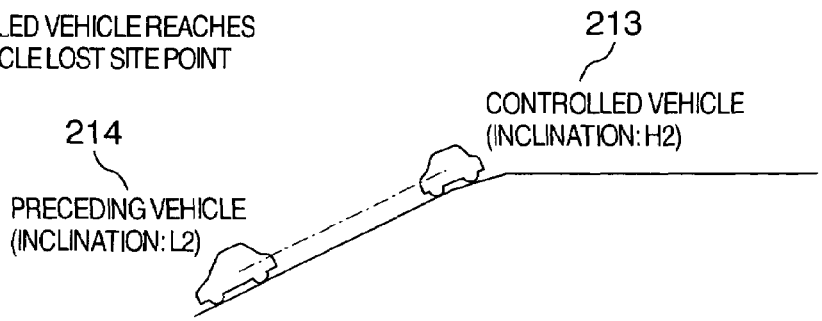

FIGS. 2A, 2B and 2C schematically show processing steps of a preceding-vehicle lost condition when a preceding vehicle departs from a headway distance detection range of the controlled vehicle. The processing steps are processed in the cruise control system 103 or in the navigation device.

Processing steps S201 to S203 in FIG. 2A correspond to the operations when the system loses the preceding vehicle in FIG. 2B. Processing steps S204 and S205 correspond to the operations when the controlled vehicle arrives at a preceding-vehicle lost site point (where the preceding vehicle departed from the headway distance detection range of the controlled vehicle) in FIG. 2C. In the processing step S201, since the preceding vehicle is present in the headway distance detection range of the controlled vehicle, the cruise control system 103 can keep a headway distance set by the driver under ACC control.

When a preceding vehicle 212 next reaches a descending slope site point and departs from the headway distance detection range of the controlled vehicle in FIG. 2B, the program proceeds to the step S202 to determine a temporary lost condition of the preceding vehicle. The word "the temporary lost condition of the preceding vehicle" refers to a condition where the preceding vehicle departs from the headway distance detection range of the controlled vehicle due to such a terrain shape as a slope or a curve as shown in FIG. 2B. For example, the temporary lost condition is when an inclination difference 210 takes place between the slope on the controlled vehicle and the slope on the preceding vehicle. The temporary lost condition determining operation will be detailed in FIGS. 6 and 11.

When the program determines a temporary lost condition (when the preceding vehicle departs from the headway distance detection range of the controlled vehicle), the program goes to the step S203 to perform predetermined speed control as the operation in the temporary lost condition. As an example of the predetermined speed control, the program (1) keeps the speed of the controlled vehicle in the temporary lost condition, (2) finds a speed of the preceding vehicle on the basis of a relative speed to the preceding vehicle in the temporary lost condition under conditions that the speed is not higher than the set speed of the cruise control system 103, controls or sets the speed of the preceding vehicle at a target speed of the controlled vehicle, (3) evaluates the speed of the controlled vehicle and acceleration speed, and sets the target speed to be lower during deceleration or higher during acceleration for the vehicle speed control. For the purpose of informing the user of the temporary lost condition, the display or sound output of the navigation device can be used.

Next, when a controlled vehicle 213 runs for a predetermined time, the program determines that the controlled vehicle arrived nearly at the lost condition site point of the preceding vehicle 212 as shown in FIG. 2C, The word "predetermined time" refers to a time when it is assumed that the controlled vehicle 213 ran at the speed of the controlled vehicle in the temporary lost condition by a distance between the site point of the controlled vehicle at the time of detecting the preceding-vehicle lost condition and the preceding-vehicle lost site point.

In the step S204, as the operation after the controlled vehicle runs for the predetermined time, the program determines a terrain difference between the position of the controlled vehicle 213 and the position of a virtual preceding vehicle 214 away from the controlled vehicle by the headway distance in the temporary lost condition, and determines continuation of the temporary lost condition. In this way, even when the determination of continuation of the temporary lost condition causes the terrain shape such as an ascending or descending slope to vary continually, the program can perform the operation in the temporary lost condition and execute predetermined speed control. The temporary lost-condition continuation determining process will be detailed in FIGS. 7 and 12.

When the program finds a condition of releasing the temporary lost condition through the temporary lost-condition continuation determining process, the program shifts to acceleration or constant-speed control without the preceding vehicle in the step S205. When the program is already acquiring the preceding vehicle, on the other hand, the program returns to follow-up control. The cruise control states to be controlled by the cruise control system 103 will be detailed in FIG. 4.

As another method for determining whether or not the preceding vehicle 212 is located nearly at the lost site point, the program compares the position of the controlled vehicle with road information stored in the navigation device and including information about inclination change site points or about site points having small curvature radii, determines the temporary lost condition, and informs the adaptive cruise control system of its determined result, details of which will be shown in an embodiment 2.

Details of software operation will be explained with use of FIGS. 3 to 8.

Figure 3:
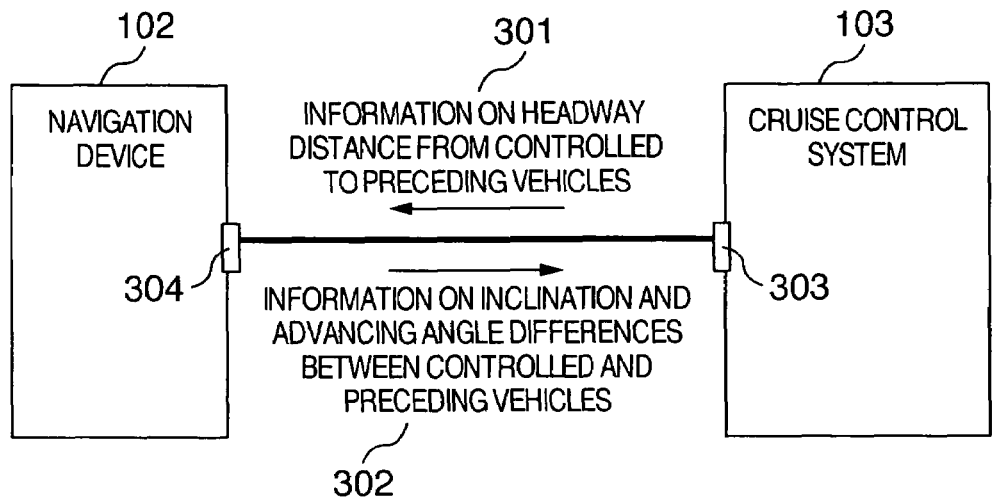
FIG. 3 is a data interface between a navigation device and an ACC system.

FIG. 3 shows contents of data transfer between the navigation device 102 and the cruise control system 103. The navigation device 102 performs data transfer with the cruise control system 103 via a communication means such as CAN (Controller Area Network).

The cruise control system 103 transmits a headway distance 301 between the controlled vehicle and the preceding vehicle to the navigation device 102. The navigation device 102 transmits an inclination difference between the controlled vehicle and the preceding vehicle and an advancing angle difference 302 between the controlled vehicle and the preceding vehicle to the cruise control system 103. Since the navigation device 102 transmits the inclination difference and the advancing angle difference 302, the cruise control system 103 can acquire information for use in the determination of the temporary lost condition. The navigation device 102 and the cruise control system 103 have terminals 303 and 304 for receiving therein a communication line for information communication.

Figure 4:
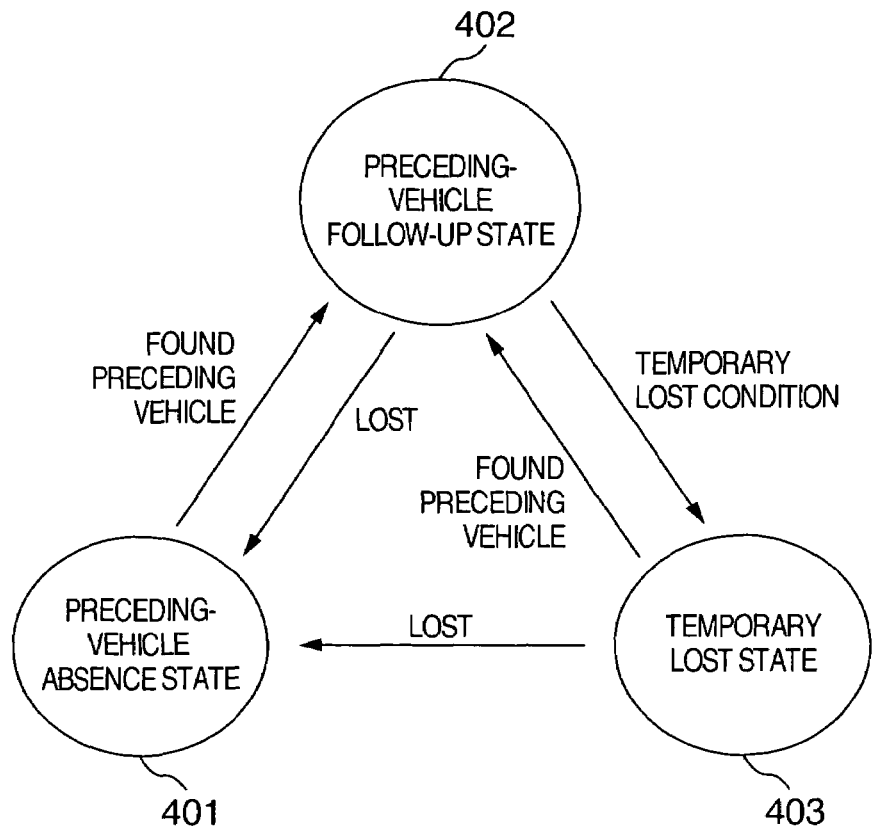
FIG. 4 is a state transition diagram of preceding vehicle follow-up.

FIG. 4 shows a state transition diagram for preceding vehicle follow-up in the cruise control system 103. It is assumed in this example that a set vehicle speed entered by the driver of the controlled vehicle at the interface 108 is 80 km/h and the speed of the preceding vehicle is 60 km/h for the convenience of explanation. Further, the cruise control system 103 has 4 control states (1) to (4) which follow as an example. That is, (1) a constant speed control state in which the preceding vehicle is not present and the controlled vehicle runs at a constant set speed (80 km/h); (2) a deceleration control state in which the controlled vehicle detects the preceding vehicle (60 km/h) and decelerates the set speed (80 km/h) down to the speed (60 km/h) of the preceding vehicle; (3) a follow-up control state in which the controlled vehicle detects the preceding vehicle (60 km/h) to keep a headway distance proportional to the speed of the controlled vehicle according to the speed (60 km/h) of the preceding vehicle; and (4) an acceleration control state in which the preceding vehicle departs from the headway distance detection range for reasons (for example, line change) other than the terrain shape and the controlled vehicle is accelerated slowly up to the set speed (80 km/h).

In a preceding-vehicle absence state 401, the system executes constant speed control. When finding a preceding vehicle, the system transits the preceding-vehicle absence state 401 to a preceding-vehicle follow-up state 402. In the course of transmitting to the preceding-vehicle follow-up state 402, the system performs deceleration control.

In the preceding-vehicle follow-up state 402, the system executes follow-up control. When the system temporarily loses the preceding vehicle during the follow-up control, the system transits the preceding-vehicle follow-up state 402 to a temporary lost state 403. The word "temporary lost condition" refers to a state in which the preceding vehicle departs from the headway distance detection range of the controlled vehicle due to the terrain shape such as an inclination or a curve as mentioned above.

In the temporary lost state 403, the system executes the aforementioned predetermined speed control. The predetermined speed control includes, for example, (1) keeping the speed of the controlled vehicle in the temporary lost condition, (2) finding the speed of the preceding vehicle from the relative speed to the preceding vehicle in the temporary lost condition under conditions that the vehicle speed is not higher than the set speed of the cruise control system 103 and setting the found speed of the preceding vehicle at a target speed of the controlled vehicle, and (3) evaluating the speed of the controlled vehicle and acceleration, setting the target speed at a reduced value during deceleration and at an increased value during acceleration.

In the temporary lost state 403, when the system again finds a preceding vehicle, the system returns the temporary lost state 403 to the preceding-vehicle follow-up state 402. In the cruise control of this case; deceleration, constant speed, or acceleration control is determined by a relationship between the speed of the controlled vehicle and the set speed at the time of finding the preceding vehicle.

When failing to find a preceding vehicle and releasing the temporary lost condition based on the determination of continuation of the temporary lost condition in the temporary lost state 403, the system transits the temporary lost state 403 to the preceding-vehicle absence state 401. The determination of continuation of the temporary lost condition will be detailed in FIGS. 7 and 12.

Figure 5:
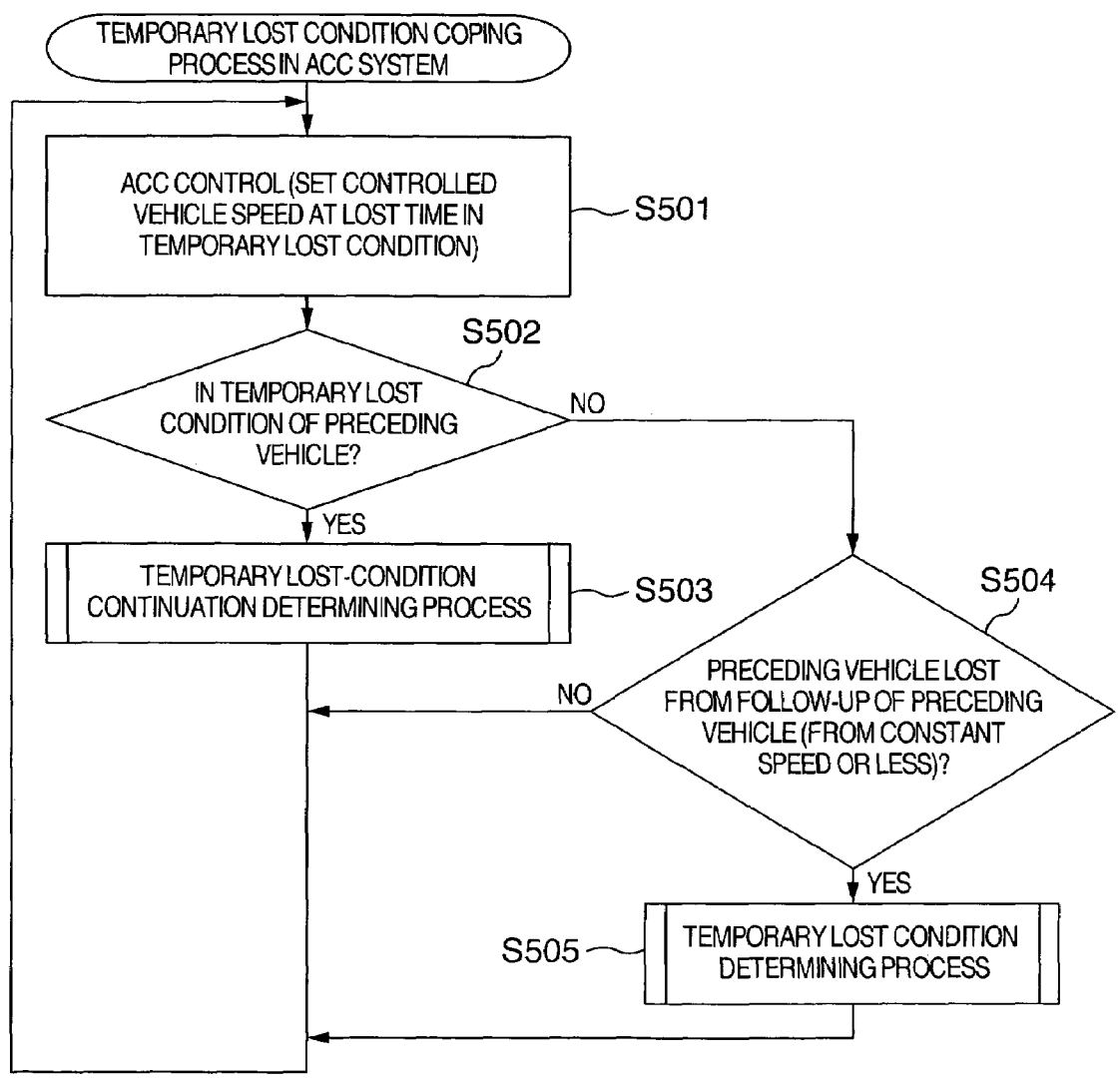
FIG. 5 is a flow chart showing how to cope with a temporary lost condition in the ACC system.
Figure 6:
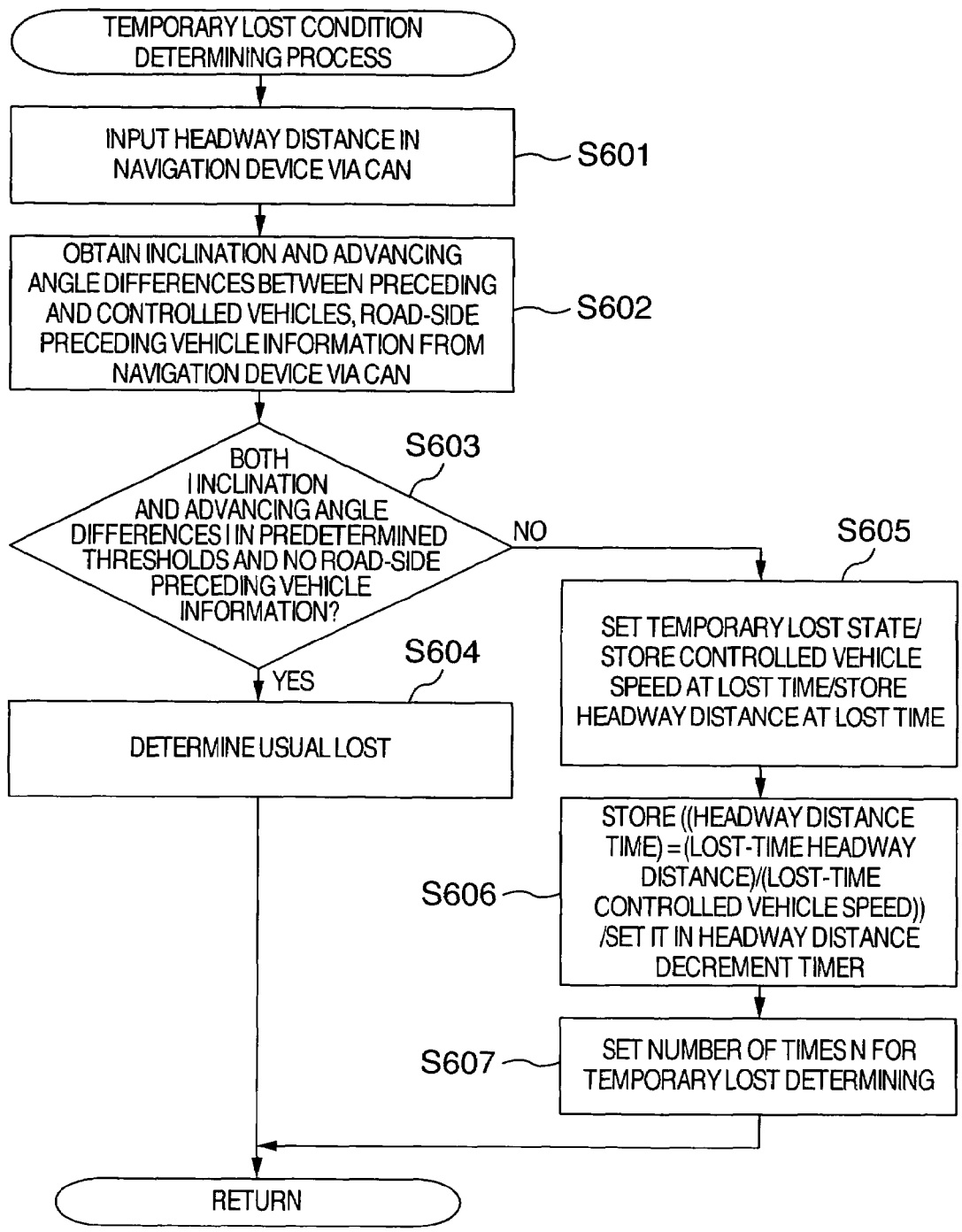
FIG. 6 is a flow chart showing a temporary lost condition determining process.
Figure 7:
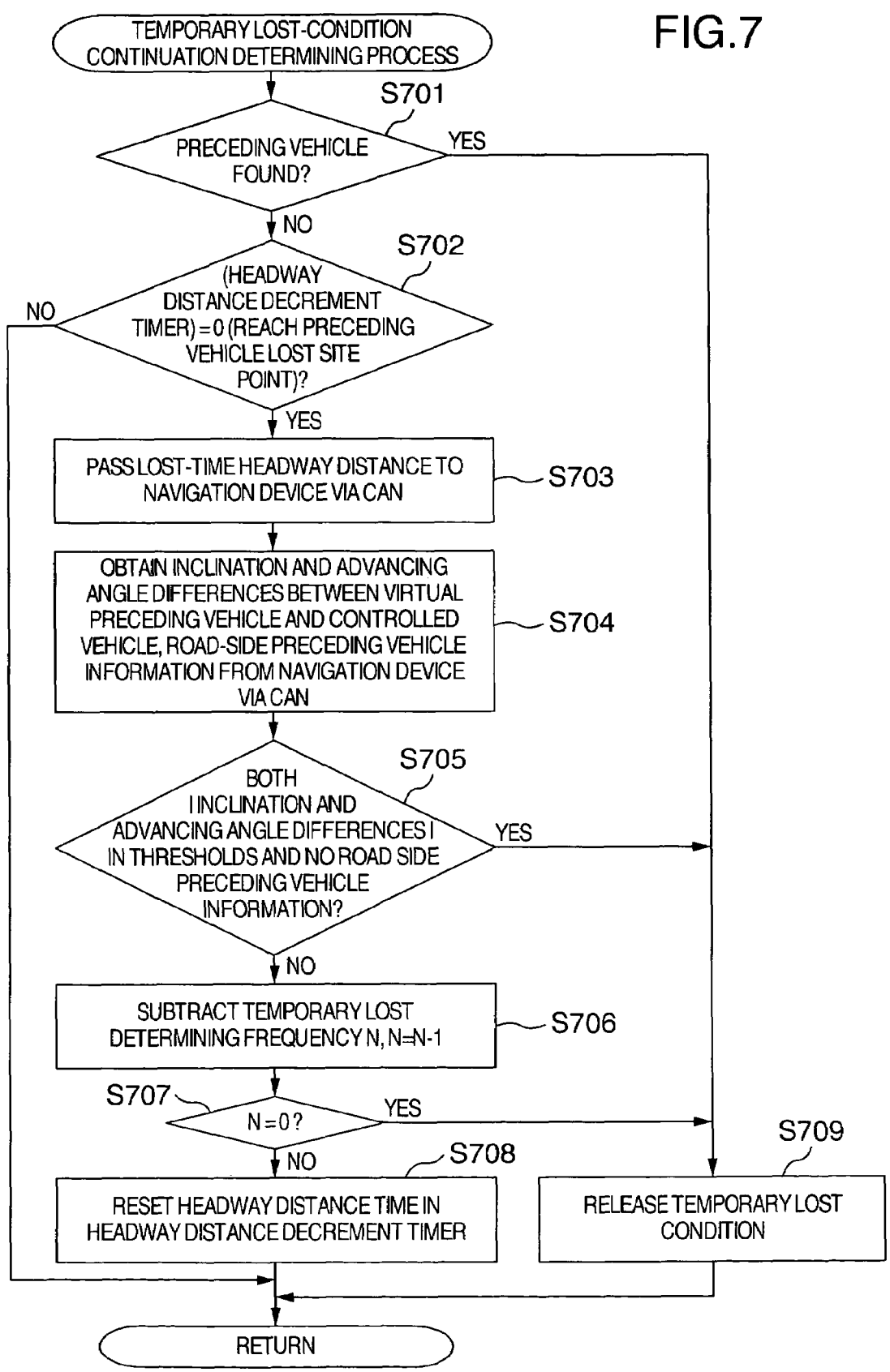
FIG. 7 is a flow chart showing a temporary lost-condition continuation determining process.

FIG. 5 is a flow chart showing how to cope with a temporary lost condition in the ACC system. The operation of FIG. 5 is periodically executed at intervals of a short time necessary for control. FIG. 6 is a flow chart showing a temporary lost condition determining process in the operation of FIG. 5. FIG. 7 is a flow chart showing a temporary lost-condition continuation determining process in the operation of FIG. 5.

Explanation will be made as to a flow of a series of processing operations starting with the "preceding-vehicle follow-up state", reaching the "temporary lost state" through "temporary lost condition determining operation", and returning to the "preceding-vehicle follow-up state (or preceding-vehicle absence state)" after the "temporary lost-condition continuation determining operation".

The "preceding-vehicle follow-up state" refers to a state in which a conventional ACC control loop of returning to a step S501 via a step S501, a step S502 of NO determination, and a step S504 of NO determination (not lost preceding vehicle) is repeated.

The program performs the "temporary lost condition determination" in the step S504. When determining YES (lost preceding vehicle) in the step S504, the program proceeds to a step S505 of temporary lost condition determining operation or process (see FIG. 6). FIG. 6 is a flow chart for executing the temporary lost condition determining process on the basis of an inclination difference and an advancing angle difference between the controlled vehicle and the preceding vehicle. In a step S601, a headway distance output from the headway distance detecting device is input to the navigation device via the CAN. In a step S602, the program acquires an inclination difference and an advancing angle difference between the position of the preceding vehicle and the position of the controlled vehicle as well as road-side preceding vehicle information if available from the navigation device via the CAN. In a step S603, the program sets the absolute values of the inclination difference and advancing angle difference to be smaller than respective predetermined threshold values. In the absence of the road-side preceding vehicle information, the program proceeds to a step S604. In the step S604, the program determines not the temporary lost condition of the preceding vehicle caused by the terrain shape but a usual lost condition. The "usual lost condition" refers to the lost condition of the preceding vehicle as when the preceding vehicle changes its lane on a flat road or enters a road or field not listed in map information, excepting the temporary lost condition of the preceding vehicle caused by a terrain shape. Such usual lost condition can be quickly determined.

When any of the absolute values of the inclination difference and advancing angle difference is larger than the corresponding predetermined threshold value or when the road-side preceding vehicle information is present in the step S603, the program determines it as the temporary lost condition.

Explanation will now be made as to the threshold values of the inclination difference and advancing angle difference. The threshold values can also be modified according to the plus or minus sign of the inclination difference, the performance of the navigation device, etc. When the inclination difference is larger than 0, this is when the preceding vehicle comes to a descending slope. When the inclination difference is smaller than 0, this is when the preceding vehicle comes to an ascending slope. The predetermined threshold values on the descending or ascending slope may be modified according to the performance of the navigation device or the like. The temporary lost condition of the preceding vehicle caused by terrain shapes is caused, in general, by the height or width of the preceding vehicle, by the set speed of the controlled vehicle, and by a set headway distance. In this example, in view of the fact that the conditions of the preceding vehicle vary every time, the threshold values of the inclination difference and advancing angle difference are determined by the set speed of the controlled vehicle and the set headway distance. When the conditions of the preceding vehicle can be confirmed with use of a camera or the like mounted in the controlled vehicle, however, it is also possible to set the threshold values of the inclination difference and advancing angle difference on the basis of information obtained from the camera or the like. Further, the threshold values may be set to be small. For example, even when the advancing angle difference or the inclination difference is small, this condition may be processed as the temporary lost condition.

Explanation will next be made as to an example of a decision pattern estimated in the step S603. When the cruise control system loses the preceding vehicle due to the preceding vehicle coming to a descending slope during follow-up of the controlled vehicle to the preceding vehicle, the cruise control system acquires terrain information (about the inclination difference and the advancing angle difference) from the navigation device, calculates an inclination difference between the controlled vehicle position and the preceding vehicle position not smaller than the threshold value, determines the condition as the lost condition caused by the terrain shape, and performs temporary lost condition determination (determines NO in the step S603).

When the preceding vehicle comes to a curve and the system loses the preceding vehicle during follow-up of the controlled vehicle to the preceding vehicle, the cruise control system acquires terrain information (about the inclination difference and the advancing angle difference) from the navigation device, calculates an advancing angle difference between the controlled vehicle position and the preceding vehicle position not smaller than the threshold value, determines the condition as the lost condition caused by the terrain shape, and performs temporary lost condition determination (determines NO in the step S603).

When the cruise control system loses the preceding vehicle due to the lane change of the preceding vehicle on a level and straight road during the follow-up of the controlled vehicle to the preceding vehicle, the cruise control system acquires terrain information (about the inclination difference and the advancing angle difference) from the navigation device, calculates an inclination difference between the controlled vehicle position and the preceding vehicle position and the advancing angle difference between the controlled vehicle position and the preceding vehicle position being both smaller than the respective threshold values, determines the absence of the preceding vehicle, and smoothly accelerates the controlled vehicle (determines YES in the step S603).

When the cruise control system loses the preceding vehicle due to the lane change of the controlled vehicle on a straight slope having a constant inclination during follow-up of the controlled vehicle to the preceding vehicle, the cruise control system acquires terrain information (about the inclination difference and the advancing angle difference) from the navigation device, calculates an inclination difference between the controlled vehicle position and the preceding vehicle position and the advancing angle difference between the controlled vehicle position and the preceding vehicle position being both smaller than the respective threshold values, determines the absence of the preceding vehicle, and smoothly accelerates the controlled vehicle (YES decision in the step S603).

In the step S605, the system sets itself in the temporary lost state, stores the speed of the controlled vehicle in the temporary lost condition, and stores a headway distance in the temporary lost condition. In the step S606, further, the system divides the headway distance in the temporary lost condition by the speed of the controlled vehicle in the temporary lost condition to find a headway distance time required until the controlled vehicle reaches the preceding-vehicle lost site point. The system sets the found headway distance time in a headway distance decrement timer to use it for determination of the fact that the controlled vehicle reached the preceding-vehicle lost site point. In this connection, the headway distance time may be found from an equation (1) which follows, considering the acceleration of the controlled vehicle.

(Headway distance)=(controlled vehicle speed)×(headway distance time)+0.5×(acceleration)×(headway distance time)×(headway distance time) (1)

After the controlled vehicle advances by the headway distance, the system performs the temporary lost-condition continuation determining process to be detailed in FIG. 7. A number N of determination times is set in the step S607. For example, when N is set at 2, after the temporary lost condition, the controlled vehicle advances as far as the position of the preceding vehicle and the system performs the temporary lost-condition continuation determining process (first time). When the system is still in the lost condition continuation condition, the controlled vehicle further advances by the headway distance and the system performs the temporary lost-condition continuation determining process (second time). For example, when the preceding vehicle comes to a slope during follow-up of the controlled vehicle to the preceding vehicle and the cruise control system loses the preceding vehicle due to the lane change, the system acquires the terrain information (about the inclination difference and the advancing angle difference) from the navigation device, calculates an inclination difference between the controlled vehicle position and the preceding vehicle position not smaller than the threshold value, and determines the lost condition due to the terrain shape. When a number of temporary lost condition determining times is set at once, the controlled vehicle advances as far as a site point where the preceding vehicle departed from the controlled vehicle detection range. The presence of the preceding vehicle causes the system to be set in the preceding-vehicle follow-up state. The absence of the preceding vehicle causes the system to be set in the preceding-vehicle absence state, enabling smooth vehicle speed control (YES decision in the step S603).

When determining it as the temporary lost condition, the system performs the temporary lost condition process in order to set the controlled vehicle in the "temporary lost state". When the system is in the temporary lost state in the step S501 of FIG. 5, the system executes the aforementioned predetermined speed control. The predetermined speed control includes, for example, (1) keeping the speed of the controlled vehicle in the temporary lost condition, (2) finding the speed of the preceding vehicle from a relative speed with the preceding vehicle in the temporary lost condition and setting the found speed of the preceding vehicle at the target speed of the controlled vehicle, and (3) evaluating the speed and acceleration of the controlled vehicle, and setting the speed at a low value during deceleration and at a high value during acceleration. After determining the temporary lost state (YES) in the step S502, the system proceeds to the step S503 of the temporary lost-condition continuation determining process (see FIG. 7).

In FIG. 7, after losing the preceding vehicle, the controlled vehicle advances by the headway distance, and the system perform the "temporary lost-condition continuation determining process" to or not to release the temporary lost condition. When finding the preceding vehicle in a step S701, the system immediately release the temporary lost state and performs preceding-vehicle follow-up control. The cruise control when the system is shifted from the temporary lost state to the preceding-vehicle follow-up control state is determined by deceleration, constant speed or acceleration control depending on a relationship between the speed of the controlled vehicle and the set vehicle speed when the system finds the preceding vehicle.

When failing to find the preceding vehicle, the system proceeds to a step S702. Only when "0" is set in the headway distance decrement timer in the step 702, the system performs determining operations of a step S703 and subsequent steps. Otherwise, the system determines that the preceding vehicle does not arrive at the lost site point, and goes to a "return" step to terminate the routine shown in FIG. 7.

In a step S703, the system passes the headway distance of the lost condition issued from the headway distance detecting device to the navigation device via the CAN. In a step 704, the system acquires an inclination difference and an advancing angle difference between the position of the virtual preceding vehicle and the position of the controlled vehicle and if available road-side preceding vehicle information from the navigation device. In a step S705, when the absolute values of the altitude difference and the advancing angle difference are smaller than the respective threshold values, or when there is no road-side preceding vehicle information; the system determines to release the temporary lost condition and goes to a step S709.

When any one of the absolute values of the altitude difference and the advancing angle difference is larger than the corresponding predetermined threshold value or when the road-side preceding vehicle information is present in the step S705, the system proceeds to a step S706 and subtracts a number N of determining times in the temporary lost condition. When N=0 in a step S707, the system proceeds to a step S709 and releases the temporary lost condition. When N is not 0 in the step 707, the system again sets a headway distance time in the headway distance decrement timer in a step S708 to again determine the temporary lost condition. At this time, the system can divide the headway distance of the lost condition by the current controlled vehicle speed to find the headway distance time.

A number of times N for determining the temporary lost condition can also be arbitrarily set by the driver. Further, the number N can be automatically set according to cruise conditions of general public road, expressway, etc. In addition, information about terrain conditions of ascending slope, descending slope, and continuous curve can be built in the navigation device, and the determining times number N of the temporary lost condition can be previously set so as to confirm to the terrain conditions.

In FIG. 5, after the system terminates the step S503 of the temporary lost-condition continuation determining process, the release of the temporary lost condition causes the system to perform usual ACC control in the step S501. That is, when finding the preceding vehicle, the system releases the temporary lost condition and performs headway distance control. When a terrain difference between the site point of the controlled vehicle upon detection of the preceding vehicle lost condition and a site point away therefrom by the headway distance disappears, the system releases the temporary lost state and sets the set speed at the target speed set by the driver. That is, such a case that in the absence of the preceding vehicle, and the lane change of the preceding vehicle or abrupt acceleration thereof causes the preceding vehicle to depart from the headway distance detection range of the controlled vehicle, is considered.

When the number of determining times N of the temporary lost condition reaches a predetermined number, the system releases the temporary lost state. In the present of the preceding vehicle, the system performs preceding-vehicle follow-up control. In the absence of the preceding vehicle, the system sets the set speed at the target speed.

Figure 8:
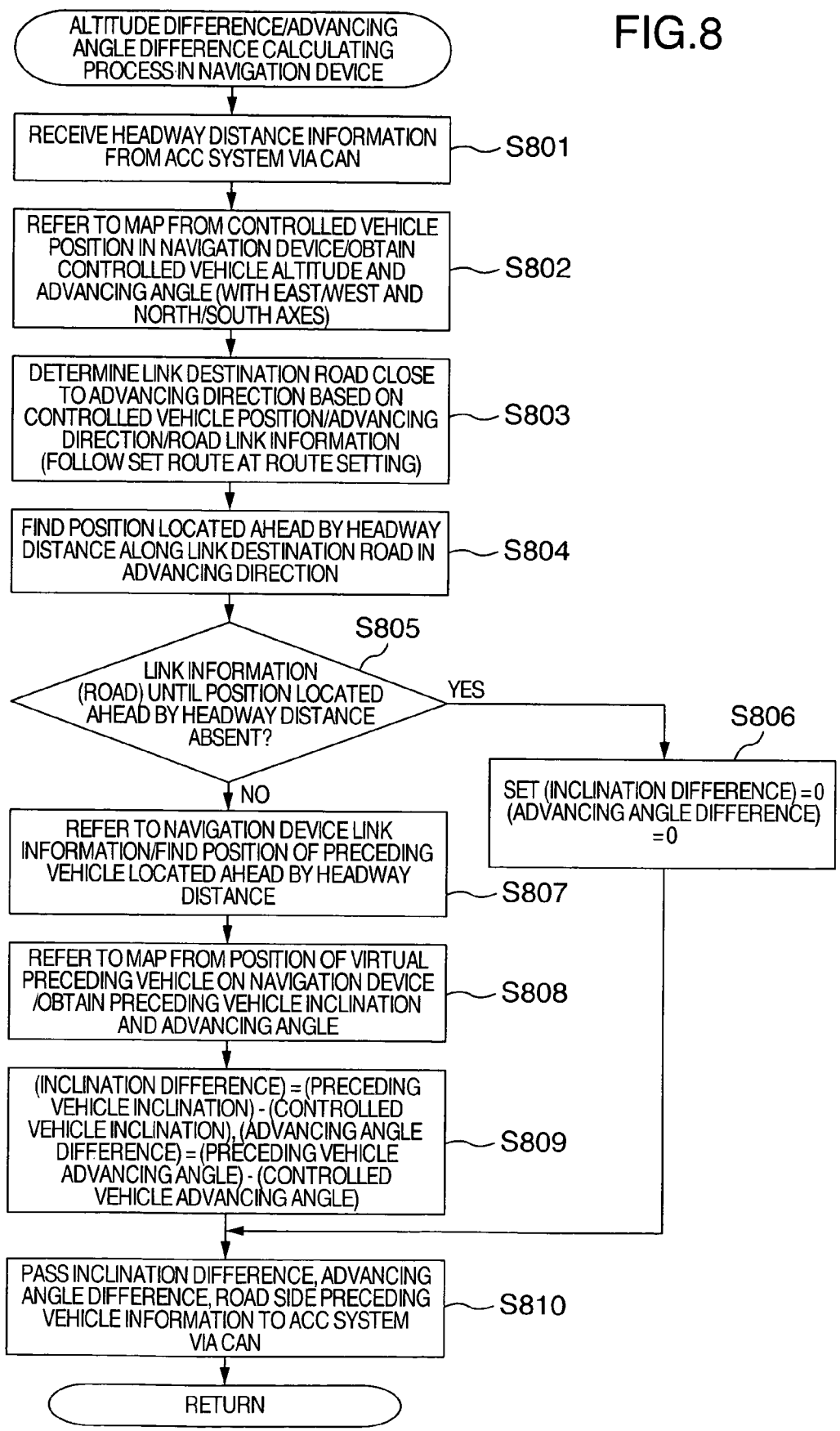
FIG. 8 is a flow chart showing how to calculate an inclination difference and an advancing angle difference in a navigation device.

FIG. 8 shows an inclination-difference/advancing-angle difference calculating process in the navigation device. In a step S801, the system receives the headway distance from the ACC system via the CAN. In a step S802, the system refers to a map from the position of the controlled vehicle in the navigation device, and obtains an inclination of the controlled vehicle and an advancing angle (with a east-west line and a south-north line as references). Information about the controlled vehicle position for use in the navigation device is obtained by demodulating a signal from a GPS (Global Positioning System) antenna, and then input to a microcomputer in the navigation device. Advancing angle information for use din the navigation device is input to the microcomputer in the navigation device as a signal from a gyro sensor.

In a step S803, the system determines a linked road close to an advancement direction on the basis of the position and advancing direction of the controlled vehicle and link information of a road. When a route is set, the system follows the set route. In a step S804, the system finds a position located ahead by the headway distance along the link destination road. In a step S805, the system determines the absence or presence of link information as far as the position located ahead by the headway distance issued from the headway distance detecting device. In the absence of the link information, the system determines that the map or the current position has a low reliability, proceeds to a step S806, and sets the altitude difference and the advancing angle difference at "0". This is considered to be when there is no map information.

Figure 18A:
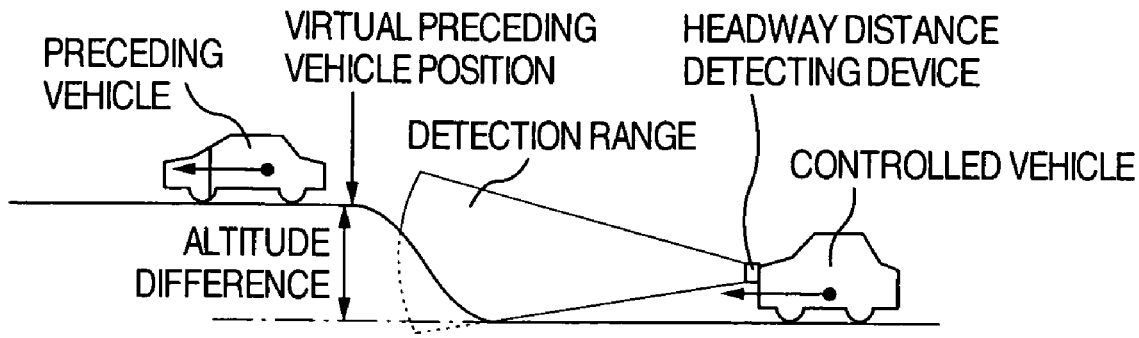
FIGS. 18A and 18B show diagrams of an example of the lost condition of the preceding vehicle.
Figure 18B:
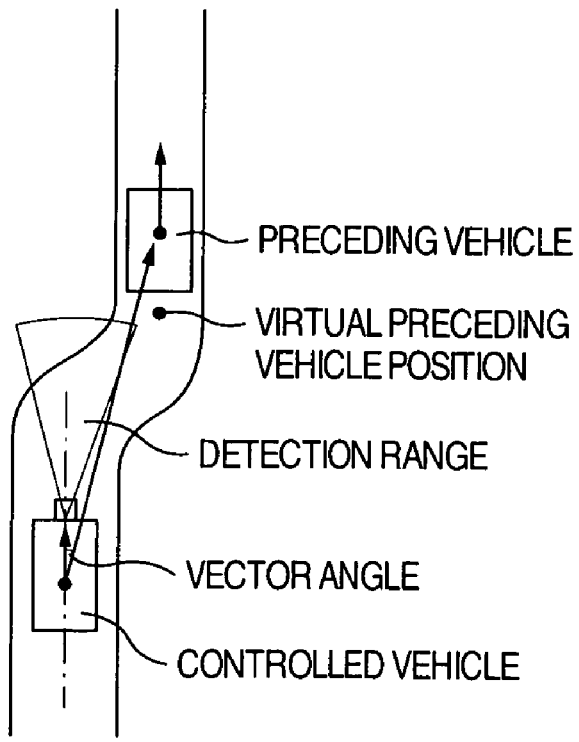

In a step S805, when there is link information about the position located ahead by the headway distance, the system proceeds to a step S807, refers to the link information of the navigation device, finds the position of the preceding vehicle positioned ahead by the headway distance, and set the found position as the position of the virtual preceding vehicle. In a step S808, the system refers to the map based on the position of the preceding vehicle on the navigation device, and acquires the inclination and advancing angle of the virtual preceding vehicle. The inclination of the position of the virtual preceding vehicle can also be found by dividing a difference in altitude between the position of the virtual preceding vehicle and the position of the controlled vehicle by the headway distance. When this method is combinedly used, the system can find the substantial inclination of the preceding vehicle position even for a terrain such as a stepwise shape having a small inclination difference between 2 points. An example of such a terrain is shown in FIG. 18A. Similarly, the advancing angle of the position of the virtual preceding vehicle can also be found from the angle of a vector connected between the position of the virtual preceding vehicle and the position of the controlled vehicle. When this method is combinedly used, the system can find a substantial advancing angle of the preceding vehicle position even for such a terrain as to have a small advancing angle difference between 2 points. An example of such a terrain is as shown in FIG. 18B. In a step S809, the system calculates values of the inclination difference and advancing angle difference between the controlled vehicle position and the preceding vehicle position. The system outputs the inclination difference and the advancing angle difference as results obtained in a step 810 to the ACC system via the CAN.

When a frequency of failing to find link information at a position located ahead by the headway distance exceeds a predetermined frequency in the step S806, the system may determine that there is a problem such as the old map and output information indicative of attention of the old map to the navigation device.

A voice operation command can be attached to the navigation device used in FIG. 8. For example, when such a command as to activate the temporary lost condition determining function as in the present embodiment, a voice recognition phrase as "ACTIVATE LOST DETERMINATION" can be set to the navigation device.

When the system determines the temporary lost condition caused by the terrain shape in the present embodiment, further, the system can also display the fact that the system is executing predetermined speed control in the temporary lost condition on the display panel of the navigation device. As a specific example of the above displaying means, it is considered to change the background color or to display an image indicative of the terrain conditions.

With respect to the navigation device, map information, etc. may be read, in some cases, from an information recording media different from the illustrated navigation device. The temporary lost condition determining frequency explained in FIG. 7 of the present invention or the aforementioned means for displaying the fact that the system is executing the predetermined speed control in the temporary lost condition can be stored in such a navigation information recording media. Further, the program used in the present embodiment can also be stored in the navigation information recording media.

Embodiment 2

In the embodiment 1, the navigation device finds the inclination difference and the advancing angle difference between the position of the controlled vehicle and the position of the virtual preceding vehicle positioned away by the headway distance. In an embodiment 2, on the other hand, an inclination change site point and a range having a small curvature radius are previously stored in the navigation device or in the navigation information recording media, so that determination of a lost condition is made depending on whether or not information about controlled vehicle position is present in the terrain conditions range.

Block diagrams and software algorithm are similar to those in the embodiment 1. Thus explanation will be made mainly as to different points between the embodiments 1 and 2.

Figure 9A:
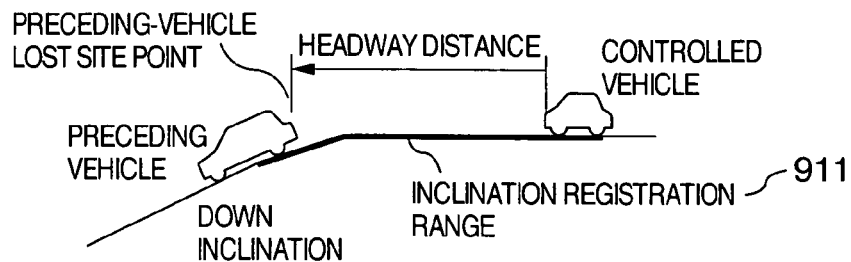
FIGS. 9A and 9B are diagrams for explaining another example of the lost condition of a preceding vehicle.
Figure 9B:
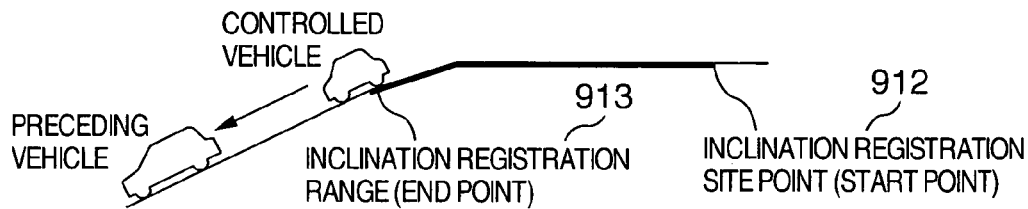

FIGS. 9A and 9B show other examples when the system loses the preceding vehicle. FIG. 9A is a diagram for determining whether or not the controlled vehicle comes to an inclination registration range when the preceding vehicle departs from the headway distance detection range of the controlled vehicle, that is, when the system loses the preceding vehicle. The system transmits headway distance information between the controlled vehicle and the preceding vehicle when the system loses the preceding vehicle to the navigation device. When the headway distance is in the inclination registration range stored in the navigation device or in the navigation information recording media, the system determines that the lost condition was caused by the inclination. Transmission and reception of the headway distance information will be detailed in FIG. 10. FIG. 9B is a diagram for determining the end of the temporary lost condition when the controlled vehicle passes an inclination registration end site point. The system loses the preceding vehicle due to the inclination in FIGS. 9A and 9B. However, even when the system loses the preceding vehicle due to a curve, the present invention can be similarly applied by setting a curvature registration range.

Explanation will now be made as to how to determine the inclination registration range. The driver enters headway distance between the controlled vehicle and the preceding vehicle to the ACC system via the interface 108, and the driver can arbitrarily set the value of the headway distance if the headway distance is within a predetermined headway distance range. The system can transmit the headway distance information into the navigation device or into the navigation information recording media having the inclination registration range information stored therein. And the inclination registration range can also be set to be longer or shorter according to the headway distance. As a result, determination can be made according to the headway distance set by the driver. How to determine the inclination registration range will be detailed in FIGS. 14 and 16.

Figure 10:
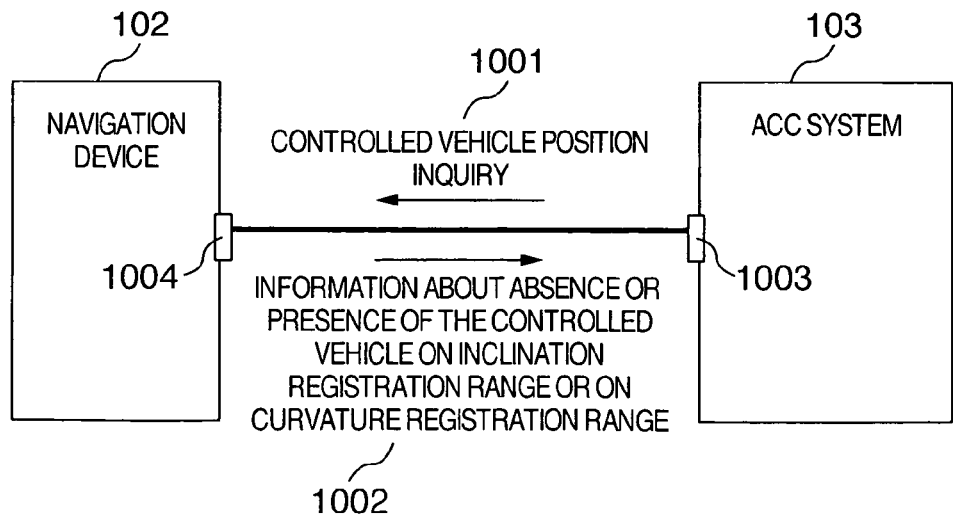
FIG. 10 is a diagram for explaining an example of the interface between the navigation device and the ACC system.

FIG. 10 shows another example of the interface between the navigation device and the ACC system. The ACC system inquires of the navigation device about the position of the controlled vehicle when the preceding vehicle was lost, and the ACC system receives information about whether or not the controlled vehicle is in the inclination registration range or in the curvature registration range from the navigation device. The navigation device 102 ad the cruise control system 103 have terminals 1003 and 1004 for receiving therein a communication line for information communication.

Figure 11:
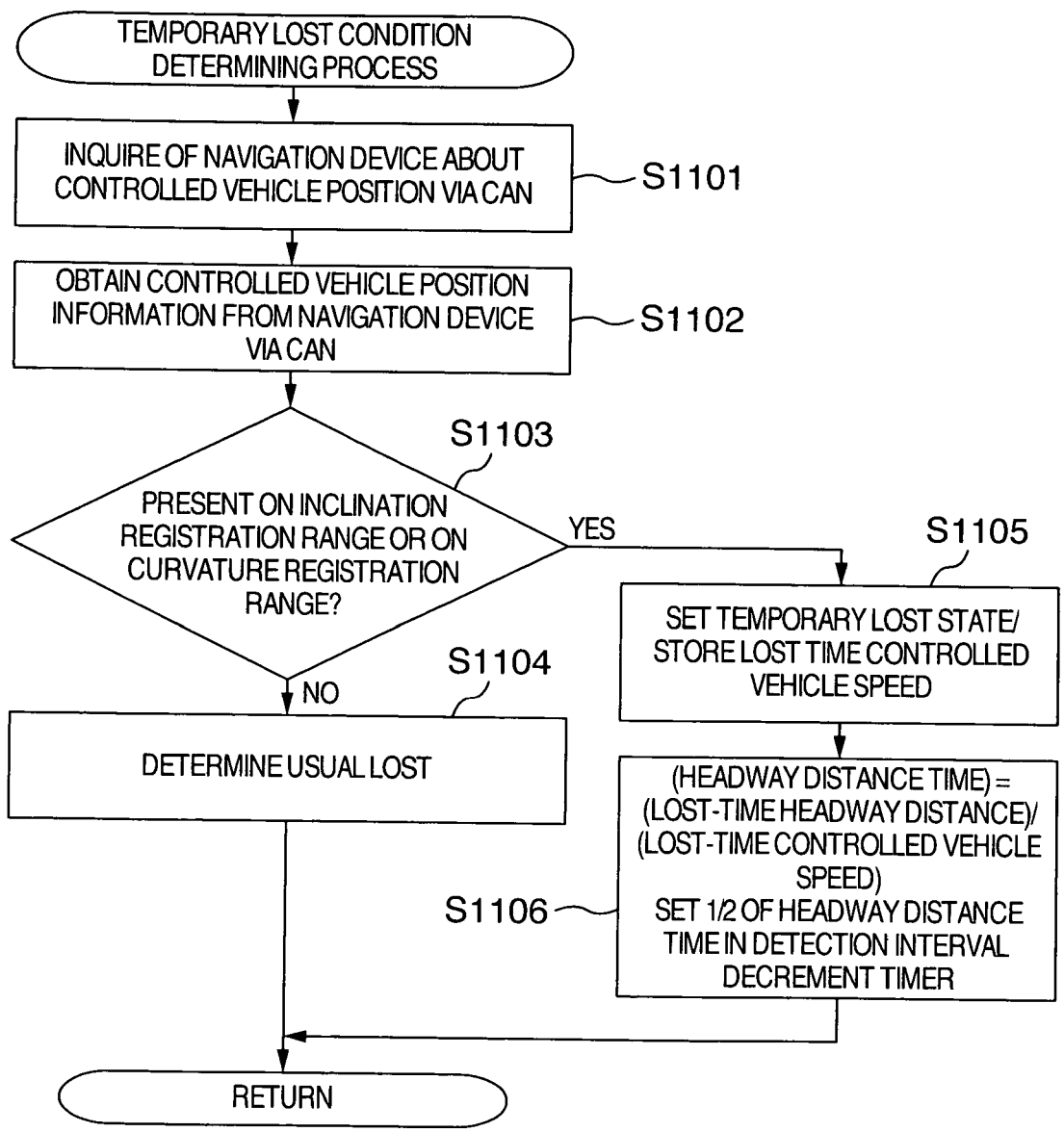
FIG. 11 is a flow chart for explaining an example of the temporary lost condition determining process.

In another example of the temporary lost condition determining process of FIG. 11, the system determines whether the position of the controlled vehicle when the preceding vehicle was lost is in the inclination registration range or in the curvature registration range in a step S1103. In a step S1106, the determination of whether or not the controlled vehicle position is in a terrain registration range is carried out at intervals of the headway distance time or smaller time. As an example, the system is set to perform the determination at intervals of a time corresponding to half of the headway distance time.

Figure 12:
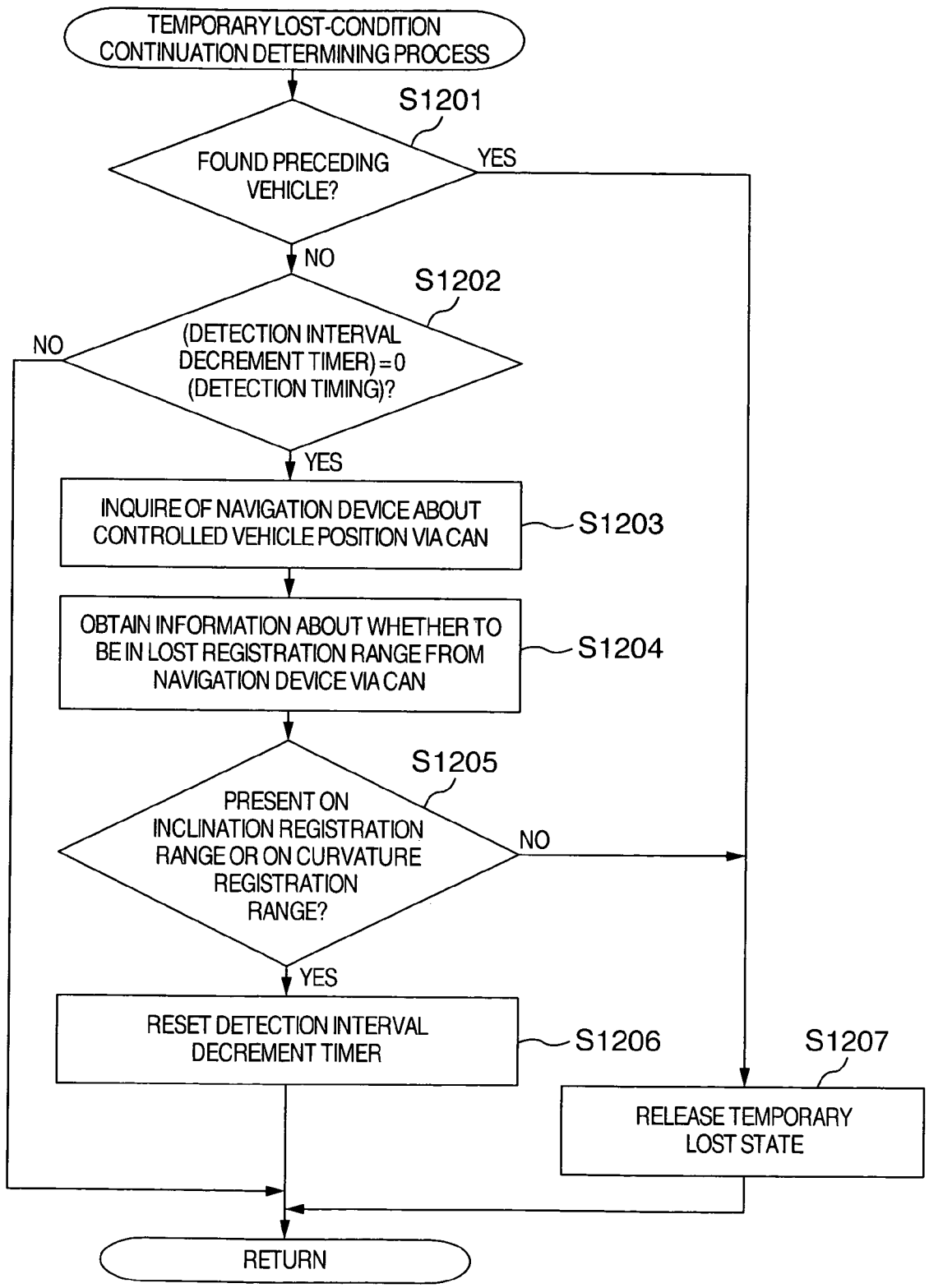
FIG. 12 is a flow chart for explaining another example of the temporary lost-condition continuation determining process.

In FIG. 12 of another example of the temporary lost-condition continuation determining process, the temporary lost continuation determining process is carried out according to whether the controlled vehicle is in the inclination registration range or in the curvature registration range in a step S1205.

Figure 13:
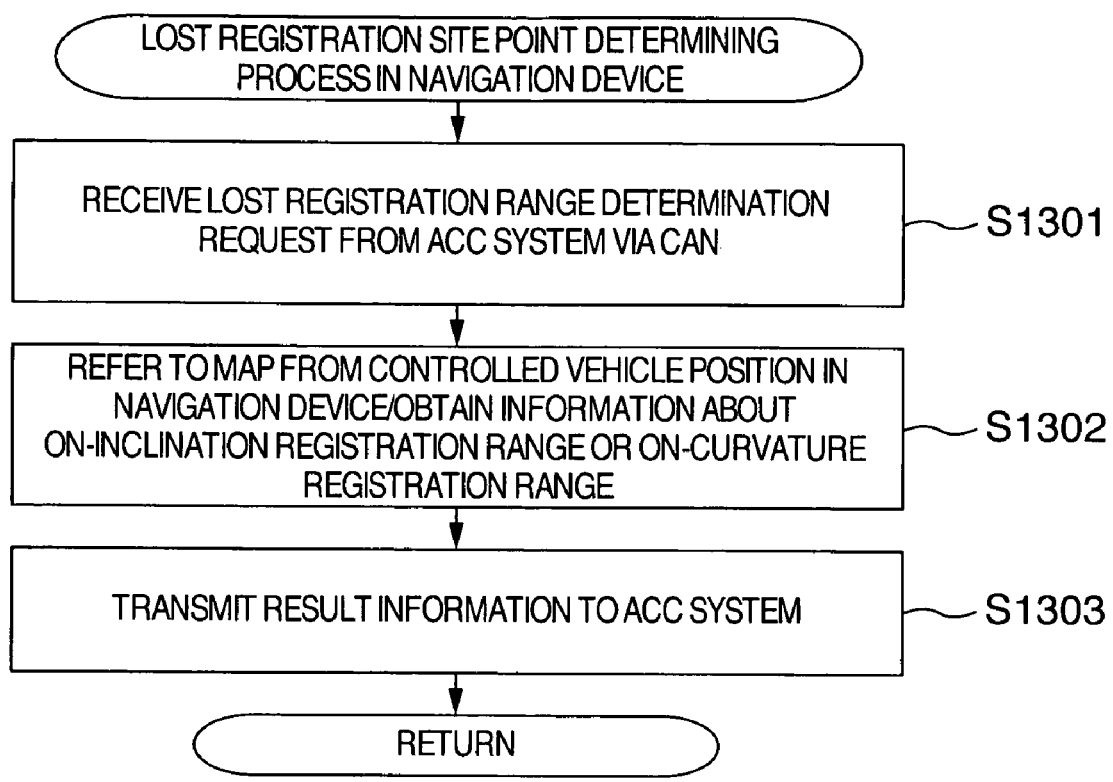
FIG. 13 is a flow chart for explaining another example of the lost registration site point determining process in the navigation device.

FIG. 13 shows another example of the lost registration range determining process in the navigation device. When the system acquires a lost registration range determination request from the ACC system in a step S1301, the system refers to a map based on the controlled vehicle position in the navigation device in a step S1302, and obtains information about the controlled vehicle is on an inclination registration site point or on a curvature registration site point. Next, the system transmits result information to the ACC system in a step S1303.

In this way, since the amount of temporary lost determining operation in the embodiment 2 can be made less than that in the embodiment 1, cruise control according to the lost condition can be quickly realized.

Figure 14:
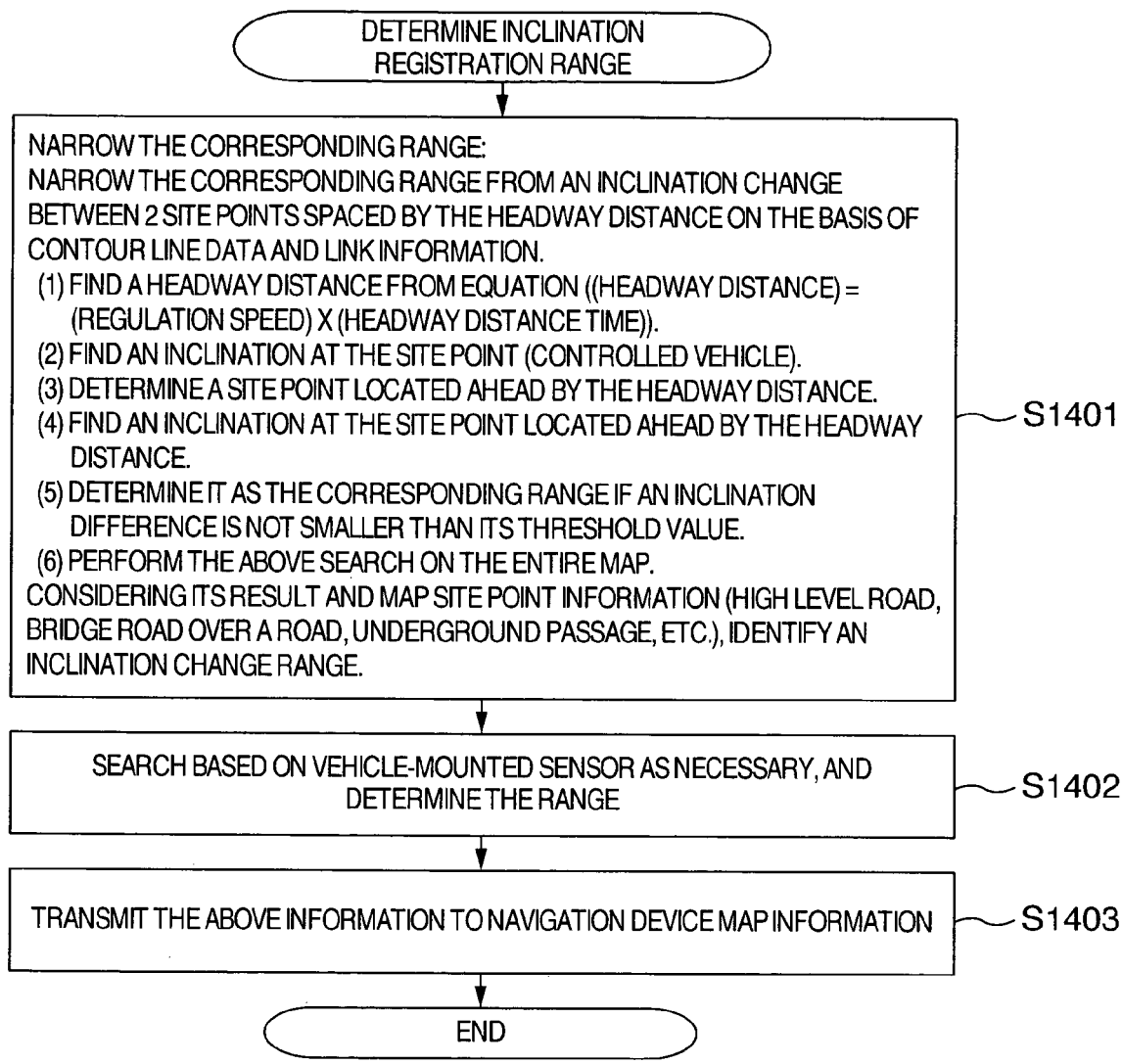
FIG. 14 is a flow chart for explaining how to find an inclination registration site point.

FIG. 14 shows an example of finding the inclination registration range. The inclination registration range is assumed to have a varying inclination. The timing of the ACC system of referring to the inclination registration range and the curvature registration range is when the controlled vehicle loses the preceding vehicle and when the controlled vehicle fails to find the preceding vehicle in the temporary lost condition.

At a road in a stepwise terrain or on the top of a hill, an inclination difference between predetermined headway distance site points may be small in some cases. Accordingly, not only points (an ascending start point of a slope and points in the vicinity of the hill top) having abrupt inclination changes where a lost condition tends to occur are extracted, but points having inclination changes before or after the abrupt change point are also registered.

In a step S1401, the corresponding range is narrowed down. The corresponding range is narrowed down in the following manner from an inclination change between 2 site points spaced by the headway distance on the basis of contour line data or link information.

(1) A headway distance is found from a regulation speed and a headway distance time. Since setting of the headway distance is carried out according to the speed in ACC control, the headway distance time can be set. (2) The inclination of the corresponding range (controlled vehicle) is found. (3) A site point positioned ahead by the headway distance is determined. (4) The inclination of the site point located ahead by the headway distance is found. (5) An inclination difference between 2 site points is found. When the inclination difference is not smaller than a threshold value, it is determined to be the corresponding range. (6) The above searching is carried out for the sampling points in a distance not longer than the headway distance on the entire map. Considering the obtained result and site point information (about high level road, a bridge over a road, underground passage, etc.) in the map, an inclination candidate range is identified. In this case, in order to increase an accuracy, a search start site point may be shifted with a distance corresponding to ½ or less of the headway distance, search is made on the entire map, and the corresponding range may be added.

In a step S1402, the candidate range is inspected on the spot as necessary, or inspected on the basis of a vehicle-mounted sensor.

Figure 15:
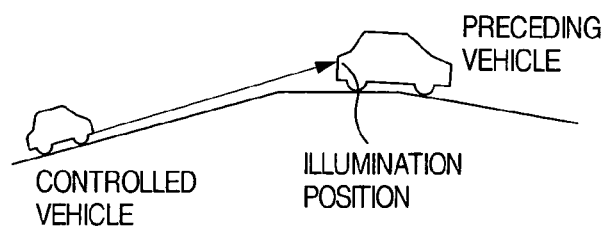
FIG. 15 is an example for explaining how to check and confirm a lost condition.

A manner of confirming and inspecting a lost condition is shown in FIG. 15. The inspection is carried out as follows. (1) A headway distance is found from the regulation speed and a headway distance time. (2) The controlled vehicle and the preceding vehicle are driven to be spaced by a headway distance. (3) The controlled vehicle emits a laser beam forwardly of the controlled vehicle in a horizontal direction, and the rear part of the preceding vehicle positioned ahead by the headway distance is illuminated with the beam. (4) An illumination position is found from a measuring device installed at the rear part of the preceding vehicle. (5) When the illumination point is shifted from upper and lower limit positions, it is determined as an inclination change range.

The inclination change range added in this way is transmitted to the map of the navigation device in a step S1403 of FIG. 14 and stored in the navigation device.

Figure 16:
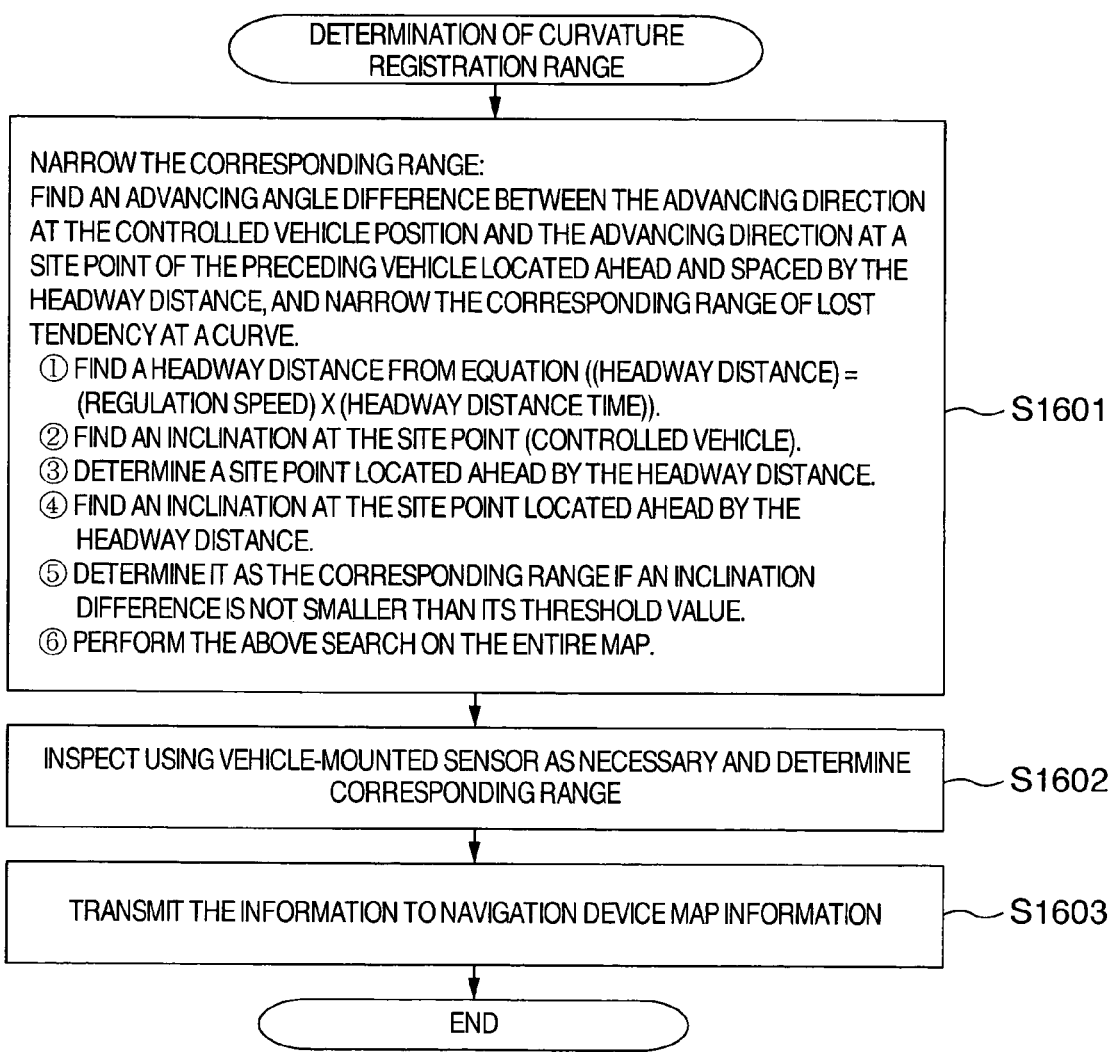
FIG. 16 is a flow chart for explaining how to find a curvature registration site point.

FIG. 16 shows how to find a curvature registration range. In a step S1601, on the basis of curvature information or link information in a road map, the system finds an advancing angle difference between the advancing direction of the controlled vehicle and the advancing direction of the preceding vehicle at the site point of the preceding vehicle located away by the headway distance, and narrows down the corresponding range where a lost condition tends to take place at a curve.

(1) The system finds a headway distance from a regulation speed and a headway distance time. (2) The system finds an advancing angle (a vector with east/west and south/north axes) of the site point (controlled vehicle). (3) The system determines a site point away by the headway distance. (4) The system finds an advancing angle (a vector with the east/west and south/north axes) at the site point away by the headway distance. (5) The system finds a difference in advancing angle between the 2 site points. When the difference is not smaller than its threshold value, the system determines it as the corresponding site point. (6) The system performs the above search for the sampling points on the entire map by sampling the map with a distance not longer than the headway distance.

In order to increase an accuracy, the system may search the entire map for the corresponding site point by shifting a search start site point by a distance corresponding to ½ or less of the headway distance, and may add the corresponding site point. Considering the obtained result and local information in the map, the system identifies an inclination candidate range. In a step S1602, the system inspects a candidate range on the spot as necessary or inspect it on the basis of a vehicle-mounted sensor. In a step S1403, the system transmits information at an inclination change site point to the map of the navigation device and stores it in the navigation device.

How to find a curvature registration range is shown in FIG. 16. However, when the curvature radius of a turn or curve is known, the system can find the curvature registration range on the basis of the value of the curvature radius.

FIG. 17 shows an advancing angle difference at a curve site point. A site point having a curvature radius with the advancing angle difference not smaller than its threshold value is registered as a curvature registration range. For example, when a regulation speed is 40 km/h, a headway distance time of 3 seconds results in a headway distance of 33.3 m. When the detection angle of a sensor is assumed from the performance of the sensor to be between about ±10°(10° in the right and 10° in the left), the threshold value of the advancing angle difference becomes 20° from an equation (2). In this example, equations (2) and (3) are derived from a geometrical conditions of FIG. 17. The curvature radius is computed as 95.9 m according to the equation (3). Accordingly, for a road having a regulation speed of 40 km/h, a range having curvature radii of 95.9 m or smaller is registered.

(advancing angle difference)=2×(sensor detection angle)  (2)

(curvature radius $R$)=(headway distance)/2/sin((advancing angle difference)/2))  (3)

Embodiment 3

In the embodiments 1 and 2, the temporary lost condition of the preceding vehicle and the release of the temporary lost condition have been determined on the basis of the map information built in the navigation device. In an embodiment 3, an application example using the communication device 107 in FIG. 1 is shown. In such a road environment as to have an out-of-sight curve, a system installed at the side of the road for detecting a vehicle running along the road and information about the vehicle to another vehicle is generally disclosed. In this example, the system installed at the road side is assumed to include a function of using communication between vehicles. And explanation will be made as to such a system as a typical road-side system.

Information on a preceding vehicle issued from the road-side system is received at the communication device 107, and the received information can be used in the navigation device. If the system acquires information on the preceding vehicle which was lost from the road side system in the step S810 in the navigation device of FIG. 8, the system sets the road side preceding vehicle information so that the information satisfies the conditions of the temporary lost condition. The road side preceding vehicle information is used to determined the temporary lost condition in the determining operation of the step S603 of FIG. 6. When the system is put in the temporary lost state based on the road side preceding vehicle information, the release of the information is carried out when the system releases the temporary lost state through the determining operation of the step S705 of FIG. 7 and finds the preceding vehicle in the step S701, and when a frequency of determining the temporary lost condition reaches a predetermined frequency in the step S707.

The embodiments 1, 2, and 3 are independently explained in order to make clear the respective features, and can be realized by building all the explained functions therein or by selecting the functions.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An adaptive cruise control apparatus of a controlled vehicle, comprising:
   a terrain shape detector for detecting a terrain shape between a position of said controlled vehicle and a position spaced away therefrom by a headway distance between the controlled vehicle and a preceding vehicle on the basis of headway distance information issued from a headway distance detecting device for detecting said headway distance and terrain shape information issued from a terrain shape estimating device for estimating a terrain shape around the position of the controlled vehicle;
   a vehicle speed controller for controlling a speed of said controlled vehicle on the basis of an output issued from said terrain shape detector;
   a first cruise control executing means for controlling so as to keep the speed of the controlled vehicle at a target speed entered by the driver or externally inputted;
   a second cruise control executing means for acquiring the headway distance information from said headway distance detecting device and controlling an actuator of the controlled vehicle so as to keep said headway distance at a headway distance set by the driver;
   a preceding-vehicle lost cause determiner, when said preceding vehicle departs from a detection range of said headway distance detecting device and the preceding vehicle is lost at a time when the actuator is controlled by said second cruise control executing means, for determining whether or not the lost condition of said preceding vehicle is caused by a terrain shape on the basis of an output issued from said terrain shape detector;
   a target speed setter, when said preceding-vehicle lost cause determiner determines that said preceding-vehicle lost condition is caused by the terrain shape, for setting a predetermined vehicle speed in said first cruise control executing means; and
   a cruise control switch for switching to the first cruise control executing means with said predetermined vehicle speed set by said target speed setter.

2. An adaptive cruise control apparatus of a controlled vehicle according to claim 1, wherein said target speed setter sets the target vehicle speed to be within the set vehicle speed set by the driver.

3. An adaptive cruise control apparatus of a controlled vehicle according to claim 1, wherein said target speed setter sets the target vehicle speed at a speed of said controlled vehicle when said preceding vehicle is lost.

4. An adaptive cruise control apparatus of a controlled vehicle according to claim 1, wherein, when said controlled vehicle arrives at a position away by said headway distance from the position of the controlled vehicle in a preceding vehicle lost state and fails to detect said preceding vehicle, said preceding-vehicle lost cause determiner, on the basis of a headway distance in said preceding vehicle lost state and the terrain shape information from said terrain shape estimating device, again determines whether or not said preceding-vehicle lost condition is caused by a terrain shape.

5. An adaptive cruise control apparatus of a controlled vehicle according to claim 1, wherein, when said controlled vehicle arrives at the position away by said headway distance from the position of said controlled vehicle in the preceding-vehicle lost condition, said cruise control switch switches to said second cruise control means or to the first cruise control means with the target vehicle speed set by the driver.

6. An adaptive cruise control apparatus of a controlled vehicle according to claim 1, wherein, when said controlled vehicle arrives at a site point spaced by a headway distance corresponding to an integral multiple of said headway distance from the position of the controlled vehicle in the preceding-vehicle lost condition, said cruise control switch switches to said second cruise control means.

7. An adaptive cruise control apparatus of a controlled vehicle according to claim 1, wherein said preceding-vehicle lost cause determiner uses the terrain shape information about a terrain shape over the headway distance in said preceding-vehicle lost condition obtained from said terrain shape estimating device as an inclination difference between the position of said controlled vehicle in the preceding-vehicle lost condition and a position spaced by said headway distance from the position of said controlled vehicle.

8. An adaptive cruise control apparatus of a controlled vehicle according to claim 1, wherein said preceding-vehicle lost cause determiner uses the terrain shape information about a terrain shape over the headway distance in said preceding-vehicle lost condition obtained from said terrain shape estimating device as an advancing angle difference between the position of said controlled vehicle in the preceding-vehicle lost condition and a position spaced by said headway distance from the position of said controlled vehicle.

9. An adaptive cruise control apparatus of a controlled vehicle according to claim 1, comprising a unit for displaying said preceding-vehicle lost condition or outputting the preceding-vehicle lost condition by sound when said preceding-vehicle lost cause determiner determines that said preceding-vehicle lost condition is caused by the terrain shape.

10. An adaptive cruise control system of a controlled vehicle, comprising:
 a headway distance detecting device for detecting a headway distance between a controlled vehicle and a preceding vehicle;
 a terrain shape estimating device for estimating a terrain shape;
 a terrain shape detector for detecting a terrain share between a position of said controlled vehicle and a position spaced by said headway distance on the basis of headway distance information issued from said headway distance detecting device and terrain share information issued from said terrain share estimating device; and
 a vehicle speed controller for controlling a speed of said controlled vehicle on the basis of an output issued from said terrain share detector;

wherein said cruise control apparatus comprises:
 a first cruise control mode for controlling the controlled vehicle so as to keep a speed of the controlled vehicle at a target vehicle speed entered by the driver or externally inputted;
 a second cruise control mode for acquiring headway distance information from said headway distance detecting device and controlling an actuator of the controlled vehicle so as to keep said headway distance at a set headway distance set by the driver;
 a preceding-vehicle lost cause determiner, when the preceding vehicle departs from a detection range of said headway distance detecting device and the preceding vehicle is lost in said second cruise control mode, for determining whether or not the lost condition of said preceding vehicle is caused by a terrain shape on the basis of an output issued from said terrain shape detector;
 a target speed setter, when said preceding-vehicle lost cause determiner determines that the lost condition of said preceding vehicle is caused by the terrain shape, for setting a predetermined target vehicle speed in said first cruise control mode; and
 a cruise control mode switch for switching to the first cruise control mode with said predetermined target vehicle speed set by said target speed setter.

11. An adaptive cruise control system of a controlled vehicle according to claim 10, wherein said terrain shape estimating device comprises a memory for storing the terrain shape information for use in said preceding-vehicle lost cause determiner.

12. An adaptive cruise control system of a controlled vehicle according to claim 11, wherein, when the terrain shape information stored in said memory is road inclination information and when an inclination difference between the position of said controlled vehicle and a position spaced from the position of said controlled vehicle by said headway distance in a preceding-vehicle lost condition is not smaller than a predetermined value on the basis of the inclination information, said preceding-vehicle lost cause determiner determines that the lost condition of said preceding vehicle is caused by the terrain shape.

13. An adaptive cruise control system of a controlled vehicle according to claim 11, wherein, when the terrain shape information stored in said memory is curvature information about a curve in a road and when an advancing angle difference between the position of said controlled vehicle and a position spaced from the position of said controlled vehicle by said headway distance in a preceding-vehicle lost condition is not smaller than a predetermined value on the basis of the curvature information, said preceding-vehicle lost cause determiner determines that the lost condition of said preceding vehicle is caused by the terrain shape.

\* \* \* \* \*

UNITED STATES PATENT AND TRADEMARK OFFICE
CERTIFICATE OF CORRECTION

PATENT NO.      : 7,650,217 B2
APPLICATION NO. : 11/475928
DATED           : January 19, 2010
INVENTOR(S)     : Mikio Ueyama It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Eighteenth Day of January, 2011

David J. Kappos
*Director of the United States Patent and Trademark Office*